April 14, 1970  D. McCATHY  3,505,813
TURBINE ENGINE WITH AXIAL LOAD BALANCING MEANS FOR THURST BEARING
Filed May 31, 1968
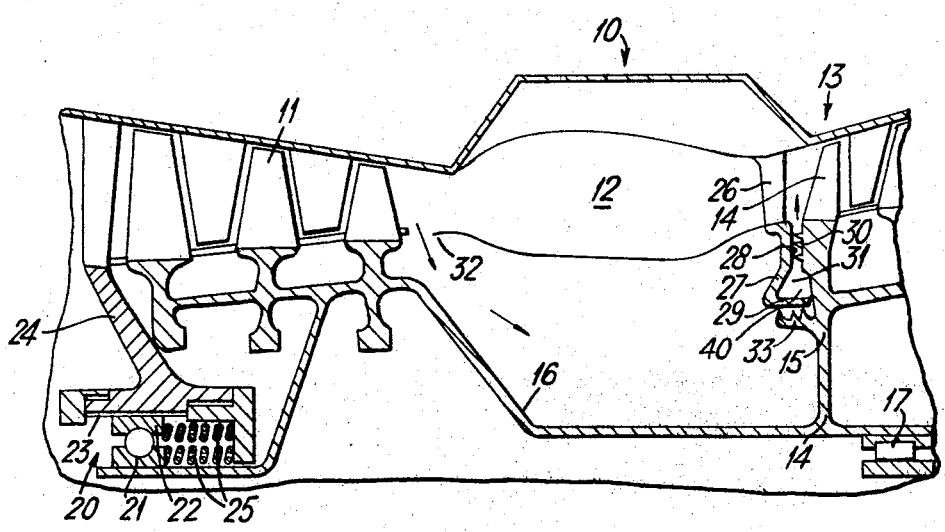
Inventor
DENIS McCARTHY
By Cushman, Darby & Cushman
Attorneys United States Patent Office 3,505,813
Patented Apr. 14, 1970

3,505,813
TURBINE ENGINE WITH AXIAL LOAD BALANCING MEANS FOR THRUST BEARING
Denis McCarthy, Derby, England, assignor to Rolls-Royce Limited, Derby, England, a British company
Filed May 31, 1968, Ser. No. 733,419
Int. Cl. F02c 7/20; F04d 29/04; F16c 19/10
U.S. Cl. 60—39.31                    10 Claims

ABSTRACT OF THE DISCLOSURE

A gas turbine engine has a rotatable assembly mounted in a thrust bearing with freedom of limited axial movement, the rotatable assembly having a part with a substantially axially facing surface which defines with fixed structure a chamber to which gas under pressure from a gas flow duct of the engine is supplied during operation of the machine, and a variable flow restriction communicating with said chamber and variable in response to axial movement of the rotatable assembly relative to the fixed structure to control the pressure in said chamber.

---

This invention relates to gas turbine engines.

Two problems associated with gas turbine engines, particularly those which run at high rotational speeds, are (a) that of excessive axial loads on thrust bearings in which rotating parts of the machine are mounted, and (b) that of minimising gas leakage through clearance seals. It is an object of the present invention to provide a gas turbine engine in which seal clearance can be controlled automatically and axial loads on a thrust bearing can be maintained at a sensibly constant level.

According to one aspect of the present invention there is provided a gas turbine engine having a rotatable assembly mounted in a thrust bearing with freedom of limited axial movement, the rotatable assembly having a part with a substantially axially facing surface which defines with fixed structure a chamber to which gas under pressure from a gas flow duct of the engine is supplied during operation of the engine, and a variable flow restriction communicating with said chamber and variable in response to axial movement of the rotatable assembly relative to the fixed structure to control the pressure in said chamber.

The variable restriction device may be formed between relatively movable parts connected to the fixed structure and the rotatable assembly respectively, said gas under pressure being supplied to or withdrawn from said chamber via said variable restriction. The variable restriction device, may, for example, be formed by a labyrinth seal provided in a radially extending space between adjacent radial surfaces on said fixed structure and on the rotatable assembly respectively, said labyrinth seal comprising, for example, radially spaced apart axially extending annular seal members provided on the fixed structure and/or the rotatable assembly.

In order to maintain the axial load on the said thrust bearing at a predetermined and substantially constant value, means may be provided for applying independently an axial load to the bearing. Said means may comprise one or more springs or hydraulically actutaed pistons.

Thus in another aspect the invention provides a gas turbine engine having a gas flow duct, a thrust bearing and a rotatable assembly mounted therein with freedom of limited axial movement, the rotatable assembly comprising a bladed rotor provided with a radially extending surface; stationary bladed structure, a radially extending wall member being attached to the stationary bladed structure radially inwardly thereof; the wall member and the radially extending surface together defining a chamber; means to supply gas from the gas flow duct to said chamber during operation of the engine, a labyrinth seal being disposed between the wall member and the radially extending surface to restrict gas flow through the chamber, axial movement of the rotatable assembly varying the gas flow restriction afforded by the labyrinth seal to control the gas pressure in the chamber; and means to apply a substantially constant axial load to the thrust bearing to bias the rotatable assembly towards an axial position whereat gas flow throught the chamber is a minimum.

The invention will be described, merely by way of example, with reference to the accompanying drawing which is a diagrammatic sectional view of part of a gas turbine engine constructed in accordance with one embodiment of the invention.

Referring to the drawing, a gas turbine 10 has in flow series an axial flow compressor 11, combustion equipment 12 and a turbine 13. The turbine 13 comprises a plurality of blades 14 mounted on a rotor disc 15. The turbine 13 is drivingly connected to the axial flow compressor 11 by way of a rotatable shaft 16 on which the rotor disc 15 is mounted.

The shaft 16 is rotatably mounted in a roller bearing 17 at its downstream end and a thrust ball bearing 20 at its upstream end. The thrust bearing 20 has an inner race 21 which is attached to the shaft 16 and an outer race 22 which is supported for limited sliding movement in an axial direction only in axially extending keyways 23 provided on a fixed support 24. The bearing outer race 22 is urged axially in an upstream direction (that is, towards the left in the drawing) by means of a plurality of springs 25 which engage the downstream facing surface of the outer race 22 at a number of angularly spaced apart positions.

A row of angularly spaced apart turbine nozzle guide vanes 26 is disposed immediately upstream of the turbine 13, the guide vanes 26 being mounted in fixed structure which includes an annular wall 27. The wall 27 is provided with a radially extending surface 28 which is disposed adjacent an outer part of an upstream radially extending and axially facing surface 40 of the rotor disc 15. A radial labyrinth seal 30 is provided on the outer part of the radially extending surface 40 of the rotor disc 15, adjacent the radially extending surface 28. Radially inwardly of the face 28 the wall 27 is provided with a cylindrical sealing face 29 disposed adjacent an axial labyrinth seal 33 provided on the disc 15 radially inwardly of the seal 30.

The axially facing surface 40 of turbine rotor disc 15 and the fixed wall 27 define a chamber 31. Air under pressure from the delivery end of the compressor 11 is bled through an aperture or apertures 32 and supplied to the chamber 31 through the fluid flow restriction defined by the axial labyrinth seal 33. In operation of the engine 10 compressed air passes in the directions indicated by the arrows into the chamber 31 and is discharged from the chamber 31 into the gas flow duct between the nozzle guide vanes 26 and the turbine 13 by way of the radial labyrinth seal 30.

The labyrinth seal 30 defines a variable restriction to gas flow therethrough in dependence on the axial position of the shaft 16 relative to the wall 27: if the rotor disc 15 and wall 27 move towards each other, on movement upstream of the shaft 16, the flow restriction through the seal 30 is relatively high, while if the disc 15 and wall 27 move apart, on movement downstream of the shaft 16, the flow restriction through the seal 30 is relatively low.

In operation of the gas turbine engine 10, therefore, the fluid pressure prevailing in the chamber 31 will, therefore, be directly dependent on the relative axial positions of the engine fixed structure (and, therefore, the wall 27) and the shaft 16. The pressure in the chamber 31 will exert a force in the downstream direction on the upstream facing surface of the rotor disc 15, this force counteracting to some extent the force exerted on the shaft 16 in an upstream direction by the action of the axial flow compressor 11.

The rotating assembly consisting of the shaft 16, compressor 11, turbine 13 and bearing 20 has freedom of limited axial movement by virtue of the mounting of the bearing outer race 22. The springs 25 exert an axial force in an upstream direction on the bearing outer race 22, the magnitude of this force being determined by the compression of the springs 25, which remains sensibly constant over the small range of axial movement of the shaft 16.

It is arranged that when the rotating assembly mounted on the shaft 16 is in the correct axial position relative to the fixed structure (24, 27) of the engine 10, the axial clearance between the fixed and rotating parts of the seal 30 is a predetermined minimum. In addition, the resultant axial load on the bearing 20 has a predetermined constant value determined by the springs 25. Therefore, when the shaft 16 is in this desired position, it is arranged that the axial force exerted on the turbine rotor disc 15 by fluid pressure is balanced by the reaction of the axial flow compressor 11 plus the small axial load exerted on the bearing 20 by the springs 25. The magnitude of the clearance at the seal 30 can be fixed, as required, by appropriately arranging the diameter of the axial seal 33 between the disc 15 and the wall 27. The bearing load is determined by suitably selecting the springs 25 with reference to the optimum loading conditions for efficient running of the bearing 20.

If the axial loads on the rotating assembly mounted on the shaft 16 should become unbalanced for some reason, there will be an unbalance of the axial load on the shaft 16 and this will result in a net axial force on the shaft 16. The shaft 16 will move axially in response to this force, and this axial movement will have the effect of changing the restriction to flow presented by the labyrinth seal 30, as described above, the latter being arranged so that the resultant change in pressure in the chamber 31 is in a sense such as to exert a force on the turbine rotor disc 15 opposed to the said axial movement of the shaft 16.

Thus if the shaft 16 were to move in an upstream direction (to the left in the drawing) the restriction to flow presented by the radial labyrinth seal 30 would increase, as described above. This would lead to an increase in the fluid pressure within the chamber 31, causing the downstream force on the turbine rotor disc 15 to increase. The result of this would be that the shaft 16 would move downstream until it reached a position in which the compressor 11 and turbine 13 were again pressure-balanced, the axial load on the bearing 20 being determined by the springs 25.

The arrangement of the invention is seen to operate in such a way as to maintain the shaft 16 in a substantially constant axial position relative to the fixed structure of the engine, allowing minimum seal clearance at the turbine to be maintained under all conditions of operation, while maintaining the rotating assembly in a pressure-balanced condition. Thus the resultant axial load on the bearing 20 is maintained substantially constant as determined by the springs 25.

The labyrinth seal members 30 and 33 can be so designed that, when the shaft 16 is in its desired axial position, the flow of air, as indicated by the arrows, is adequate for cooling purposes.

It will be appreciated that the invention, although specifically described in its application to a turbine rotor disc 15 could also be applied to a compressor rotor disc.

I claim:

1. A gas turbine engine having a gas flow duct, a thrust bearing, and a rotatable assembly mounted therein with freedom of limited axial movement, the rotatable assembly having a part with a substantially axially facing surface, fixed structure which defines a chamber with said surface, means for supplying gas under pressure from the gas flow duct to said chamber during operation of the engine, means defining a variable flow restriction communicating with said chamber, said means varying the restriction in response to axial movement of the rotatable assembly relative to the fixed structure to control the gas pressure in said chamber.

2. A gas turbine engine as claimed in claim 1 including means for applying a substantially constant axial load to the thrust bearing.

3. A gas turbine engine as claimed in claim 2 in which the means for applying the axial load to the thrust bearing biases the rotatable assembly towards an axial position relative to the fixed structure in which gas leakage through the said flow restriction is a minimum.

4. A gas turbine engine as claimed in claim 1 comprising relatively movable parts connected to the fixed structure and the rotatable assembly respectively, and between which said means defining the variable restriction is formed, gas under pressure being supplied to or withdrawn from said chamber via said variable restriction.

5. A gas turbine engine as claimed in claim 1 in which the fixed structure and the rotatable assembly have adjacent radially extending surfaces, defining a radially extending space therebetween, and in which said means defining a variable flow restriction is a labyrinth seal provided in said space.

6. A gas turbine engine as claimed in claim 1 in which said rotatable assembly includes a turbine rotor disc, on which the substantially axially facing surface is provided.

7. A gas turbine engine according to claim 6 in which said fixed structure includes turbine nozzle guide vanes and an annular wall being attached thereto, said chamber being defined by said annular wall and by said turbine rotor disc.

8. A gas turbine engine as claimed in claim 2 in which said means for applying an axial load to the thrust bearing comprises at least one spring.

9. A gas turbine engine according to claim 8 in which the axial load exerted on the bearing by said at least one spring remains substantially constant within the limits of axial movement of the rotatable assembly relative to the fixed structure.

10. A gas turbine engine having a gas flow duct, a thrust bearing and a rotatable assembly mounted therein with freedom of limited axial movement, the rotatable assembly comprising a bladed rotor provided with a radially extending surface; stationary bladed structure, a radially extending wall member being attached to the stationary bladed structure radially inwardly thereof; the wall member and the radially extending surface of said rotatable assembly together defining a chamber; means to supply gas from the gas flow duct to said chamber during operation of the engine, a labyrinth seal being disposed between the wall member and the radially extending surface of said rotatable assembly to restrict gas flow through the chamber, axial movement of the rotatable assembly varying the gas flow restriction afforded by the labyrinth seal to control the gas pressure in the chamber; and means to apply a substantially constant axial load to the thrust bearing to bias the rotatable assembly towards an axial position whereat gas flow through the chamber is a minimum.

References Cited

UNITED STATES PATENTS

| | | | |
|---|---|---|---|
| 2,647,684 | 8/1953 | Lombard | 253—69 |
| 2,746,671 | 5/1956 | Newcomb | 253—69 |
| 3,118,593 | 1/1964 | Robinson et al. | 230—116 |
| 3,147,913 | 9/1964 | Davies et al. | 230—116 XR |
| 3,433,020 | 3/1969 | Earle et al. | 60—39.08 XR |

FOREIGN PATENTS

| | | |
|---|---|---|
| 624,494 | 6/1949 | Great Britain. |
| 805,330 | 12/1958 | Great Britain. |

MARK NEWMAN, Primary Examiner

A. O. HERRMANN, Assistant Examiner

U.S. Cl. X.R.

230—116; 308—176